(12) United States Patent
Chang et al.

(10) Patent No.: US 8,671,272 B2
(45) Date of Patent: Mar. 11, 2014

(54) METHOD AND SYSTEM FOR CHANGING BIOS SETTINGS VIA TOUCH CONTROL INTERFACE BY EXECUTING AN APPLICATION UNDER OS WITHOUT ENTERING SYSTEM MANAGEMENT MODE

(75) Inventors: Huang Chen Chang, Taipei Hsien (TW); Ke Chih Hua, Taipei Hsien (TW); Wang Wan Chen, Taipei Hsien (TW)

(73) Assignee: Gigabyte Technology Co. Ltd, New Taipei (TW)

( * ) Notice: Subject to any disclaimer, the term of this patent is extended or adjusted under 35 U.S.C. 154(b) by 309 days.

(21) Appl. No.: 13/171,485

(22) Filed: Jun. 29, 2011

(65) Prior Publication Data

US 2012/0272049 A1   Oct. 25, 2012

(30) Foreign Application Priority Data

Apr. 20, 2011   (TW) .............................. 100113631 A

(51) Int. Cl.
*G06F 9/00* (2006.01)
*G06F 15/177* (2006.01)

(52) U.S. Cl.
USPC ........................................................... 713/2

(58) Field of Classification Search
USPC ............................................................. 713/2
See application file for complete search history.

(56) References Cited

U.S. PATENT DOCUMENTS

| 2005/0177710 A1* | 8/2005 | Rothman et al. ................... 713/2 |
| 2005/0283599 A1* | 12/2005 | Zimmerman et al. ............ 713/2 |
| 2007/0255936 A1* | 11/2007 | Stemen ............................. 713/2 |
| 2010/0011201 A1* | 1/2010 | Ahn et al. ......................... 713/2 |
| 2010/0205598 A1* | 8/2010 | Shao et al. ..................... 717/174 |
| 2011/0193804 A1* | 8/2011 | Shin et al. ...................... 345/173 |

\* cited by examiner

*Primary Examiner* — Thomas Lee
*Assistant Examiner* — Xuxing Chen
(74) *Attorney, Agent, or Firm* — Chun-Ming Shih

(57) ABSTRACT

A touch control method for setting the basic input output system (BIOS) is provided. The setting method includes the following steps. The BIOS transmits an initial configuration data to a memory. An application program reads the initial configuration data from the memory and evocates an input interface displaying on a touch panel. The input interface includes a plurality of selecting items corresponding to the initial configuration data. The application program receives a setting signal from the touch panel and executes the selecting item according to the setting signal. The application program produces a renewal configuration data and the application program stores the renewal configuration data in the memory. The application program rewrites the renew configuration data back to the BIOS.

6 Claims, 5 Drawing Sheets

METHOD AND SYSTEM FOR CHANGING BIOS SETTINGS VIA TOUCH CONTROL INTERFACE BY EXECUTING AN APPLICATION UNDER OS WITHOUT ENTERING SYSTEM MANAGEMENT MODE

This application claims the benefit of the filing date of Taiwan Patent Application No. 100113631, filed on Apr. 20, 2011, in the Taiwan Intellectual Property Office, the disclosure of which is incorporated herein in its entirety by reference.

BACKGROUND OF THE INVENTION

1. Field of Invention

This invention is generally relative to a touch control method and a computer system using the same, in particular, relative to a touch control method for setting the basic input output system.

2. Related Art

Almost all present computer systems are equipped with the Basic Input Output System (BIOS). The BIOS controls and configures the basic parameters of the hardware function of the computer system. The BIOS also provides a medium for the operation system to control various hardware apparatus and hardware device. An user could enable/disable a hardware function or regulate/control the operation efficiency and operation process by amending or setting the BIOS. The BIOS initializes the hardware, detects the hardware function and guides operation system.

In early stage, an user uses the keyboard as the input device to manipulate the BIOS setting with the aid of traditional window interface in a computer system. But it is not convenient to use the keyboard because there is a restriction to regulate the BIOS by direction keys and specific keys on the keyboard. Furthermore, to access the traditional windows interface is also not a simple task because the BIOS setting shown in the traditional windows interface is a text menu which is difficult for a layperson to understand the meaning of each parameter.

In order to promote the efficiency of the BIOS setting, an easier way developed to change the BIOS setting is by a mouse. But it is still not convenient enough for an user because the setting method is not intuitional, humanistic and personalized enough. And the BIOS setting interface is still a traditional text menu which is difficult for users to enhance the computer efficiency by setting the BIOS.

SUMMARY OF THE INVENTION

This disclosure provides a touch control method for setting the BIOS and a computer system using the same.

This disclosure reveals a touch control method for setting the BIOS. The BIOS saves the initial configuration data of the BIOS into the memory. User starts up an application program to read the initial configuration data saved in the memory. The application program evocates an input interface of the BIOS setting and the application program displays the input interface on a touch panel. The input interface includes a plurality of setting items corresponding to the initial configuration data. The application program receives a setting signal from the touch panel. The setting signal is triggered by the touch panel while an object touching the touch panel. The application program executes the setting item corresponding to the setting signal and produces a renew configuration data of the BIOS. The application program transmits and saves the renew configuration data in the memory and the application program writes the renew configuration data back in the BIOS.

The computer system in this disclosure regulates the configuration data of the BIOS by the touch control method. The computer system includes a BIOS, a memory and a touch panel. There is an initial configuration data which is saved in the BIOS. The memory electrically connects to the BIOS and accommodates the initial configuration data transmitted from the BIOS. The touch panel electrically connects to the memory and displays the input interface for the BIOS setting. The input interface includes a plurality of setting items corresponding to the initial configuration data of the BIOS. When at least one setting item is triggered, the computer system correspondingly produces the renewal configuration data of the BIOS. The computer system transmits the renewal configuration data of the BIOS to the memory and saves the renewal configuration data of the BIOS in the memory. The computer system rewrites the renewal configuration data back to the BIOS.

This disclosure enables the user to regulate the BIOS by the way of the touch control method with a corresponding graphic input interface; which differs from the conventional approaches. The touch control input interface of this disclosure replaces the keyboard or the mouse. The graphic input interface of this disclosure also replaces the menu table.

This disclosure simplifies the BIOS setting method by the touch control input interface. And this disclosure replaces the traditional menu table with graphic input interface, the setting icons corresponding to the different BIOS functions or parameters are easy to understand and facilitate user's application. User could regulate the parameter of the BIOS more intuitionally by the touch control method and improve the efficiency of the computer system.

Further objects and advantages are apparent in the drawings and in the detailed description which follows.

DETAIL DESCRIPTION OF THE INVENTION

Figure 1:
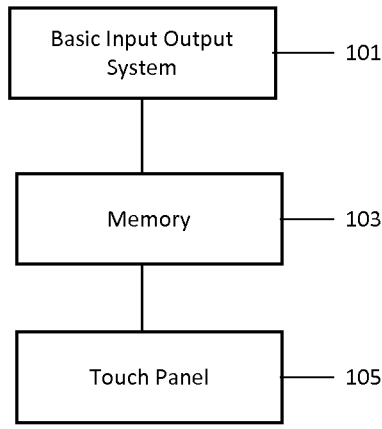
FIG. 1 illustrates the block chart of a computer system of one embodiment of the present disclosure.
Figure 2:
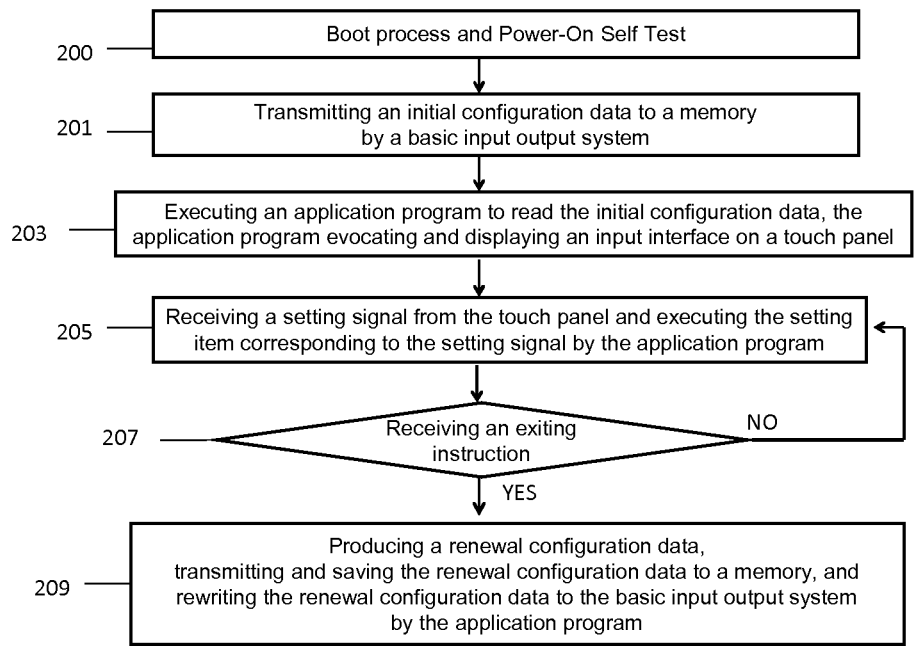
FIG. 2 illustrates the flow chart of a touch control method of one embodiment of the present disclosure.

FIG. 1 illustrates a computer system of the present disclosure, FIG. 2 illustrates a flow chart of a touch control method for setting the BIOS of the present disclosure, FIGS. 3 to 9 illustrate the application of touch control method and this is a preferred embodiment of the present disclosure.

Referring to FIG. 1, a computer system 10 of the present disclosure includes a basic input output system (BIOS) 101, a memory 103 and a touch panel 105. The computer system 10 could be a desk computer, a notebook, a laptop computer or a tablet computer, however, the computer system 10 is not limited to the specific computer systems described therein. Wherein the BIOS 101 includes an initial configuration data and the memory 103 is a Random Access Memory (RAM). The memory 103 electrically connects to the BIOS 101 and the touch panel 105 respectively.

Referring to FIG. 2 together with FIG. 1, step 200 describes the process that the computer system 10 executes the boot process and the BIOS 101 of the computer system 10 executes a Power-On Self Test (POST) process. Thus, the BIOS 101 produces an initial configuration data.

Step 201 describes the process that the BIOS 101 of the computer system 10 transmits the initial configuration data to the memory 103 and saves the initial configuration data in the memory 103.

Figure 3:
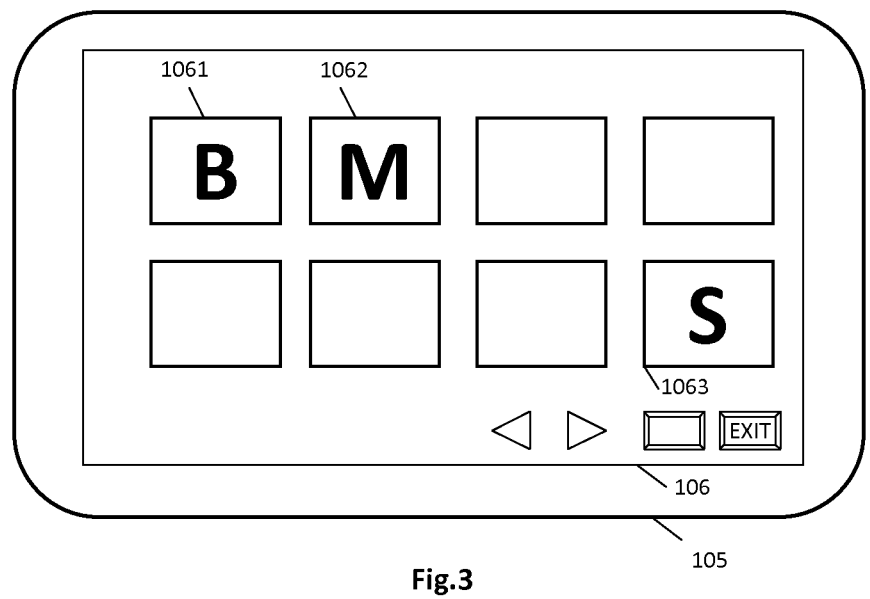
FIGS. 3 to 9 illustrate the application chart of a touch control method of one embodiment of the present disclosure.

User triggers and starts an application program up by an object. The object could be a finger, touch pen or mouse, but the object is not limited to those described therein. Step 203 describes the process that the application program reads the initial configuration data of the BIOS 101 from the memory 103. Thereafter the application program evocates an input interface 106 and displays the input interface 106 on the touch panel 105. Referring to FIG. 3, the input interface 106 includes a plurality setting items corresponding to the initial configuration.

The touch panel 105 displays the input interface 106 evocated by the application program. The input interface 106 includes a plurality of setting items such as setting item 1061, setting item 1062 and setting item 1063. Furthermore, various graphic or icon corresponds to each setting item 1061, 1062 and 1063 respectively in order to manifest that different configuration menu being set in the BIOS.

In the present embodiment, for example, the setting item 1061 represents the configuration menu related to the boot, the setting item 1062 represents the configuration data related to the monitor of the computer peripheral, and the setting item 1063 represents the setting of the input interface 106 itself. Only part of the BIOS function is described in the preferred embodiment of the invention and a better comprehension for various modifications and changes of the setting items is known to those skilled in the art, the present invention is not limited to these embodiments, but variations and modifications may be made without departing from the scope of the present invention.

The application program of the present embodiment could be executed under the operation of the operation system of the computer system 10 or started up before loading the operation system of the computer system 10. The application program of the present embodiment is described under the operation of the operation system. It will be understood that the application program started up before loading the operation system will occur to those skilled in the art, the present invention is not limited to these embodiments, but variations and modifications may be made without departing from the scope of the present invention.

While user regulates the BIOS through the input interface 106 displayed on the touch panel 105 by the way of touching, user's touch triggers a setting signal. Step 205 describes the process that the application program receives the setting signal from the touch panel 105 and executes the setting of the input interface 106 corresponding to the setting signal.

Figure 4:
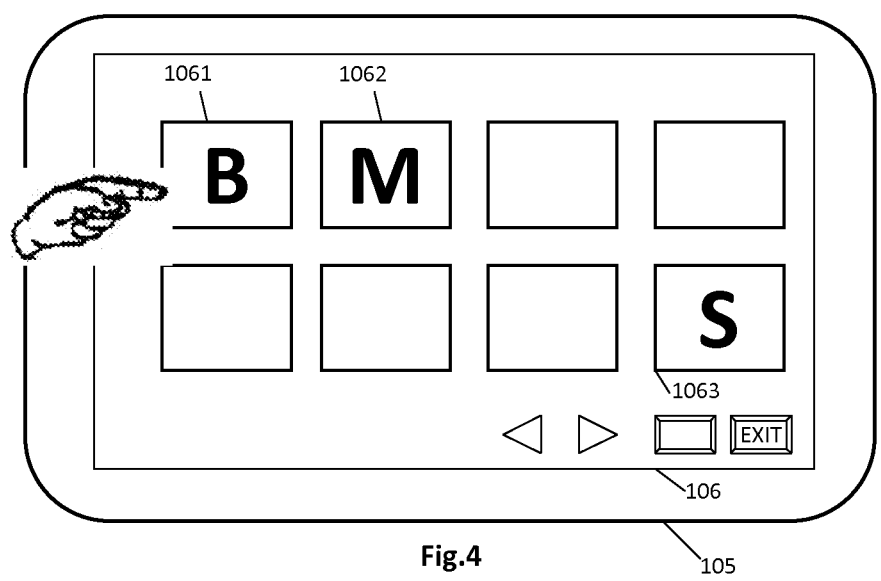
Figure 5:
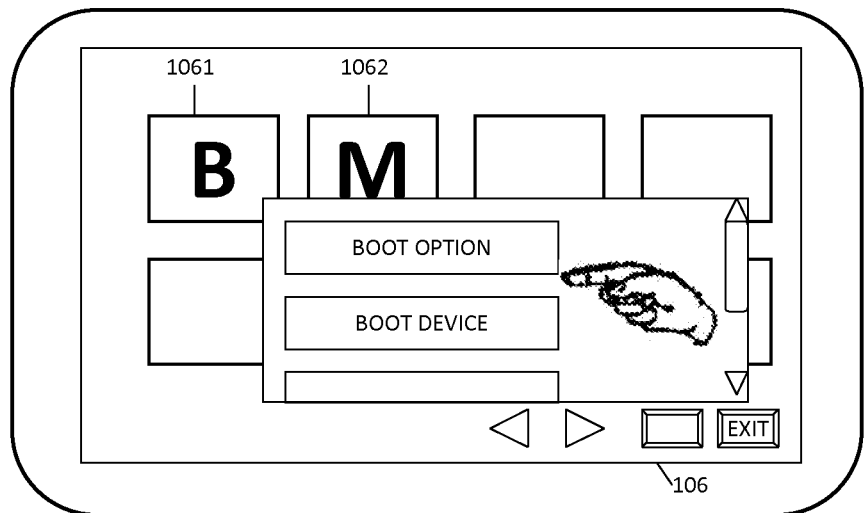

Referring to FIG. 4, while user touches the setting 1061 on the touch panel 105, user's touch triggers a setting signal. The application program receives the setting signal from the touch panel 105 and executes the setting item 1061 of the input interface 106 corresponding to the setting signal. The setting item 1061 represents the setting related to the boot process in the present embodiment. Referring to FIG. 5, the input interface 106 shows related boot options for user to regulate, for example, the option of boot process or the option of boot device.

User's touch in the present embodiment could be implemented by the finger, touch pen or other tools or other ways. The present invention is not limited to the present embodiment.

Referring to FIG. 2, step 207 describes the process that the application program compares the setting signal triggered by the touch panel 105 with an application program exiting setting. If the application program receives an instruction for exiting the application program, user can either ends the setting process of the BIOS setting or, optionally, continues the setting process of the BIOS setting and back to the step 205.

Referring to FIG. 2, if the application program receives an instruction of exiting the application program, the computer system 10 deems that user ends the setting process of the BIOS. Step 207 describes the process that the application program generates a renewal configuration data according to the setting result of the setting item in the setting process, there within the application program transmits the renewal configuration data to the memory 103 and saves it followed by the application program writing the renewal configuration data back to the BIOS 101. The BIOS 101 grabs the renewal configuration data as the initial configuration data during next booting of the computer system 10.

The application program further receives a setting signal triggered from the touch panel 105 in step 205 in the present embodiment wherein the application program drags and arranges the position of the setting item according to the setting signal to meet the operation requirement and habit of different user.

Figure 6:
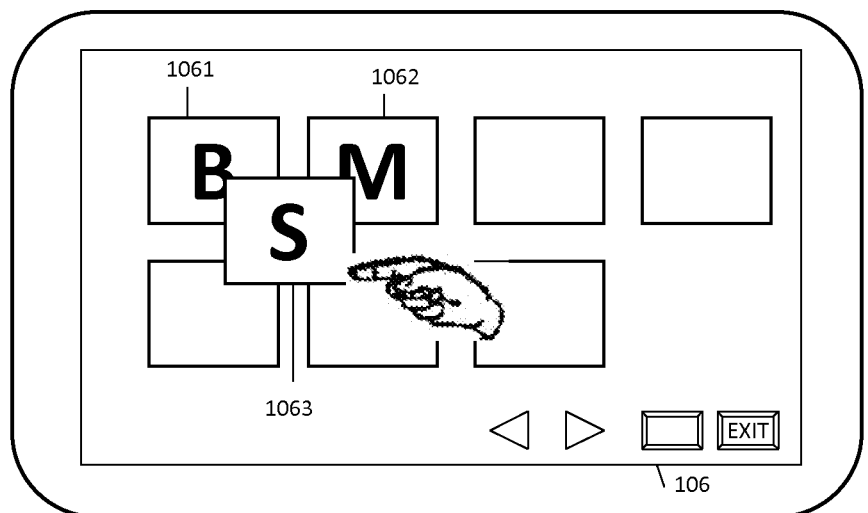
Figure 7:
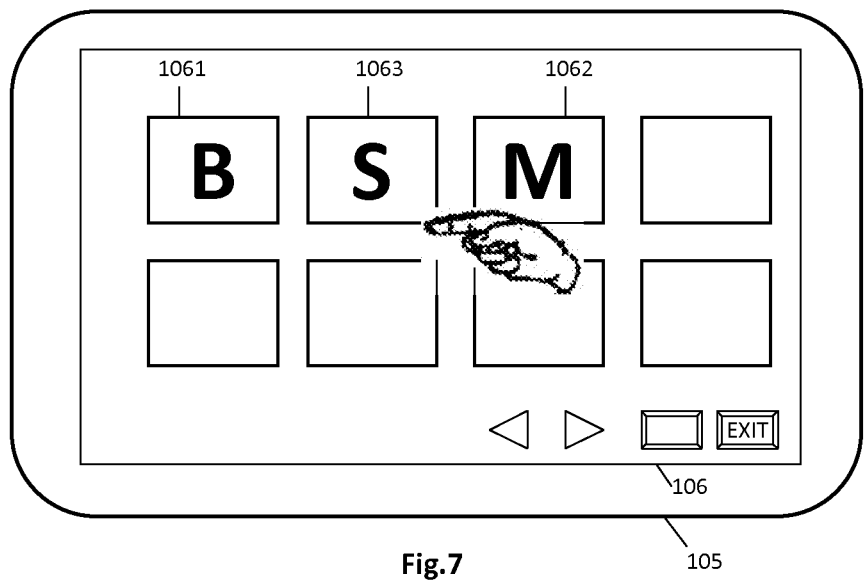

Referring to FIG. 6, user drags the setting item 1063 which is originally arranged in the rear position by the touch control method to the front position, thereafter the user disposes the setting item 1063 between the setting item 1061 and the setting item 1062. Referring to FIG. 7, it is a new arrangement after user's drag; the arrangement of the setting items of the input interface 106 is different from the arrangement in FIG. 3. User could customize the setting of the input interface 106 according to the personal requirement and operation habit of the user.

The application program further receives a setting signal triggered from the touch panel 105 in step 205, and the application program optionally decides the types and the quantity of the setting items displaying on the input interface according to the setting signal.

Figure 8:
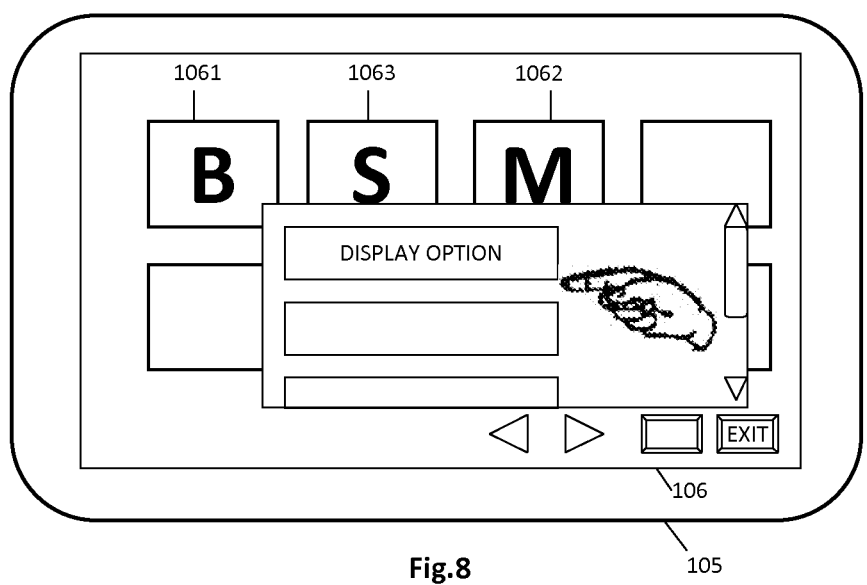

Referring to FIG. 7, while user triggers the setting item 1063 by the touch control method, the application program will display the setting corresponding to the setting item 1063. The setting item 1063 represents the setting related to the input interface 106 itself of the present embodiment. User could regulate the setting of the input interface 106 through the setting item 1063. Referring to FIG. 8, the setting corresponding to the setting item 1063 optionally decide the types and the quantity of the setting items which display on the input interface 106.

Figure 9:
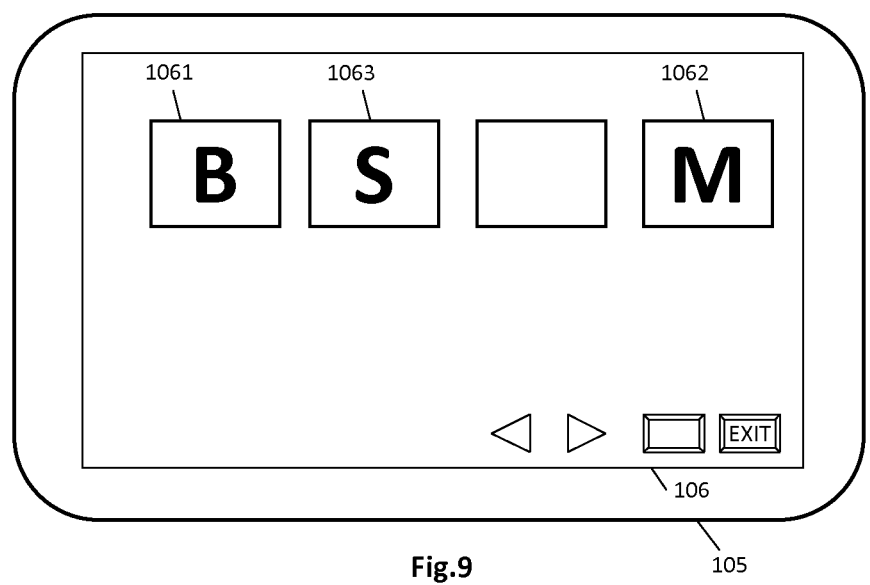

Referring to FIG. 9, the quantity of the setting items of the input interface 106 in FIG. 9 is different from the setting items in FIG. 3. User could display the setting item that is regulated frequently. And user also could hide some setting items to prevent the setting items from being regulated erroneously or unnecessarily.

The touch control method of the present disclosure is applicable to the computer system with a touch panel. While user needs to set the BIOS, user could regulate the configuration data of the BIOS by the touch control method directly. The present disclosure enhances the convenience of the BIOS setting process by the graphic input interface collaborating with the touch control method. User also could customize the operation mode or the operation routine personally by the operations including drag, display or hide.

Initially, the application program can be stored in a recording media that is readable or accessible for the computer system. The recording media could be a disk but the recording media is not limited to the disk described therein. While user loads or installs the application program in the computer system from the recording media and starts the application program up, user could utilize the touch control method for setting the BIOS.

While the disclosure has been described in terms of what is presently consider to be the preferred embodiments, it is to be understood that the disclosure needs not be limited to the disclosed embodiment. On the contrary, it is intended cover various modifications and similar arrangements included within the spirit and scope of the appended claims which are to be accorded with the broadest interpretation so as to encompass all such modification and similar structures. It is therefore intended by the appended claims to define the true scope of the invention.

What is claimed is:

1. A touch control method for setting a basic input output system, the method comprising the following steps:
    transmitting an initial configuration data to a memory;
    saving the initial configuration data in the memory by the basic input output system;
    loading an operation system;
    executing an application program under the operation system to read the initial configuration data saved in the memory;
    evocating an input interface and displaying the input interface on a touch panel by the application program, wherein the input interface comprises a plurality of setting items corresponding to the initial configuration data;
    receiving a setting signal from the touch panel by the application program, wherein the setting signal is triggered on the touch panel;
    executing the setting item corresponding to the setting signal by the application program;
    receiving an instruction of exiting the application program;
    producing a renewal configuration data by the application program;
    transmitting the renewal configuration data to the memory and saving the renewal configuration data in the memory by the application program; and
    rewriting the renewal configuration data to the basic input output system by the application program.

2. The method of claim 1, further comprising a step of executing a Power-On Self Test function and producing the initial configuration data by the basic input output system.

3. The method of claim 1, wherein the method further comprises the following steps:
    receiving a setting signal from the touch panel by the application program; and dragging and arranging the setting item corresponding to the setting signal on the touch panel.

4. The method of claim 1, wherein the method further comprises the following steps:
    receiving a setting signal from the touch panel by the application program; and optionally displaying the setting item corresponding to the setting signal on the touch panel by the application program.

5. A computer system, comprising:
    a basic input output system;
    a memory electrically connected to the basic input output system and storing an initial configuration data saved by the basic input output system;
    a touch panel connected to the memory electrically and displaying an input interface; and
    a recording media, wherein the recording media is readable for the computer system and the input interface is carried out by executing an application program under an operating system while the recording media is accessed by the computer system;
    wherein the input interface comprises a plurality of setting items corresponding to the initial configuration data read by the application program, the plurality of setting items are executed corresponding to a setting signal by the application program, the setting signal is received from the touch panel by the application program,
    wherein, upon receiving instruction of exiting the application program, the application program produces a renewal configuration data, the application program saves the renewal configuration data in the memory, and the application program saves the renewal configuration data to the basic input output system.

6. The computer system of claim 5, the application program is configured to display input interface on the touch panel.

* * * * *